(12) United States Patent  
Richard et al.

(10) Patent No.: US 8,997,482 B2  
(45) Date of Patent: Apr. 7, 2015

(54) BRAKE SYSTEM WITH ELECTRIC SERVO BRAKES

(75) Inventors: Philippe Richard, Chelles (FR); François Gaffe, La Turballe (FR); Bastien Cagnac, Cramoisy (FR); Chris Anderson, Paris (FR); Raynald Sprocq, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 608 days.

(21) Appl. No.: 13/394,690

(22) PCT Filed: Aug. 30, 2010

(86) PCT No.: PCT/EP2010/062625  
§ 371 (c)(1),  
(2), (4) Date: Mar. 7, 2012

(87) PCT Pub. No.: WO2011/026804  
PCT Pub. Date: Mar. 10, 2011

(65) Prior Publication Data  
US 2012/0167565 A1 Jul. 5, 2012

(30) Foreign Application Priority Data  
Sep. 7, 2009 (FR) ..................................... 09 04247

(51) Int. Cl.  
*F15B 7/00* (2006.01)  
*B60T 11/32* (2006.01)  
*B60T 13/74* (2006.01)  
*B60T 7/04* (2006.01)

(52) U.S. Cl.  
CPC ............... *B60T 13/745* (2013.01); *B60T 7/042* (2013.01)

(58) Field of Classification Search  
CPC ............................ B60T 13/745; B60T 11/32  
USPC .................................................. 60/545, 582  
See application file for complete search history.

(56) References Cited

U.S. PATENT DOCUMENTS

| 6,220,675 B1 | 4/2001 | Steffes |
| 2002/0158510 A1 | 10/2002 | Kobayashi et al. |
| 2010/0114444 A1 | 5/2010 | Verhagen et al. |
| 2010/0126167 A1 | 5/2010 | Nagel et al. |

FOREIGN PATENT DOCUMENTS

| CN | 1872599 | 12/2006 |
| JP | 2007160992 | 6/2007 |

OTHER PUBLICATIONS

PCT/EP2010/062625 International Search Report dated Oct. 13, 2010 (Translation and Original, 4 pages).

*Primary Examiner* — Edward Look  
*Assistant Examiner* — Daniel Collins  
(74) *Attorney, Agent, or Firm* — Michael Best & Friedrich LLP

(57) ABSTRACT

Brake system comprising a thrust rod (130) driven by the servobrake (200) and actuating the piston (110) of the master cylinder (100), the servobrake (200) being linked by a hydraulic actuator (270) to the control rod (230) of the brake pedal (PF).

The servobrake (200) comprises an actuator piston (220) controlled by an electric motor (265) via a rack drive (260).

A simulator chamber (250) delimited by the hydraulic actuator (270) is subdivided by an intermediate piston (240) into a rear volume (V1) and a front volume (V2), respectively delimited by the intermediate piston (240).

A duct (L1) links the rear volume (V1) to a duct (L2) linked to the front volume (V2) by a first solenoid valve (EV1) and the duct (L2) to the tank (115) by a second solenoid valve (EV2).

The piston (240) is linked to the rod (130) bearing an abutment (132) to be thrust by the actuator piston (220).

8 Claims, 3 Drawing Sheets

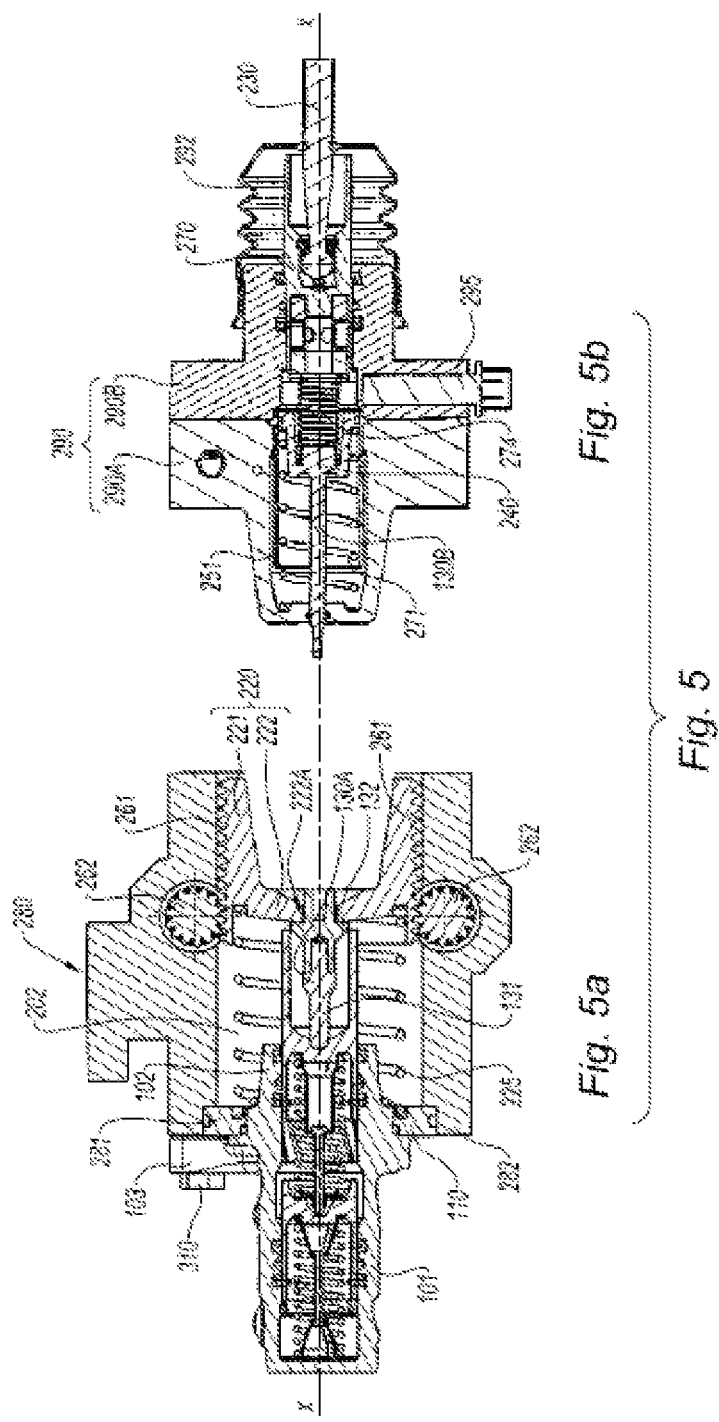

BRAKE SYSTEM WITH ELECTRIC SERVO BRAKES

BACKGROUND OF THE INVENTION

The present invention relates to a brake system with electric servobrake comprising a servobrake acting in a controlled manner on the master cylinder via a thrust rod driven by the servobrake and actuating the piston (primary piston) of the master cylinder, the servobrake being linked by a hydraulic actuator to the control rod of the brake pedal.

Such a brake system is known generally and from the document DE 10 2007 01 68 64 A1.

SUMMARY OF THE INVENTION

The aim of the invention is a brake system with servobrake allowing for a decoupled braking between the brake pedal and the master cylinder, for the effort/pressure or travel/pressure characteristics to be adjusted and for the characteristics of the servobrake to be modified, and also for active functions to be added independently of the action on the brake pedal.

To this end, the present invention relates to a brake system with electric servobrake of the type defined above, characterized in that the servobrake comprises:
- an actuator piston controlled by an electric motor via a rack drive,
- a simulator chamber delimited by the hydraulic actuator and subdivided by an intermediate piston into a rear volume and a front volume, which are variable,
  - the rear volume being delimited by the hydraulic actuator and the intermediate piston,
  - the front volume being delimited in the simulator chamber by the intermediate piston,
- a duct linking the rear volume to a duct linked to the front volume via a first solenoid valve, the duct being linked to the tank by a second solenoid valve,
  - the first solenoid valve being controlled in the open position, its uncontrolled position being the closed position,
  - the second solenoid valve being controlled in the closed position, its uncontrolled position being the open position,
- the intermediate piston is linked to the thrust rod bearing an abutment to be thrust by the actuator piston,
- the thrust rod being able to be thrust by the intermediate piston independently of the actuator piston.

The brake system with electric servobrake allows for a decoupled braking, that is to say, a braking in which the action on the brake pedal is not transmitted directly to the master cylinder but via the servobrake. The control is decoupled in normal operation; it is direct in emergency operation via the control rod and the hydraulic actuator acting on the primary piston of the master cylinder.

This brake system makes it possible to adjust the effort/pressure characteristics but also the travel/pressure characteristics by an electronic control.

The brake system according to the invention makes it possible to modify the characteristics of the servobrake and to add active functions such as the prefilling, ACC, ABB-H programs, without the brake pedal being involved.

According to another advantageous characteristic, the duct at the output of the first solenoid valve is linked to a brake simulator.

This makes it possible to have the driver benefit from a reaction simulating the reaction of the brake circuits even though the system is totally decoupled.

According to another characteristic, the actuator piston consists of a sleeve, the outer surface of which includes racks in positions that are diametrically opposite relative to the axis of the system for guiding and driving in translation the actuator piston partly overlapping the simulator chamber.

This embodiment makes it possible to simply and with little bulk incorporate the rack drive in the housing of the servobrake.

According to another advantageous characteristic, the intermediate piston has a section greater than the section of the hydraulic actuator.

This section difference allows for a gearing-down of the effort when the brake system is working in emergency mode without the assistance of the servobrake.

According to another advantageous characteristic, the body of the servobrake consists of a front part and a rear part,
- the substantially cylindrical front part receiving the rear of the housing of the master cylinder via an assembly ring and the two pinions of the rack drive and the actuator piston bearing the racks, this front part also being provided with the transmission and the motor of the rack drive as well as the front part of the thrust rod with its abutment and the return spring,
- the rear part comprising the intermediate piston attached to the rear part of the thrust rod, the return spring of the intermediate piston and the hydraulic actuator and its return spring.

According to another advantageous characteristic, the rear part consists of two pieces of which the front piece forms the simulator chamber with a jacket receiving the intermediate piston and the rear piece houses the hydraulic actuator, the return spring of the hydraulic actuator being placed between the hydraulic actuator and the intermediate piston.

According to another advantageous characteristic, the brake system comprises a control circuit and a pressure sensor linked to the rear volume of the simulator chamber, contained between the hydraulic actuator and the intermediate piston to detect the pressure prevailing in this volume and transmit a pressure signal to the control circuit, the control circuit being linked to the first solenoid valve and to the second solenoid valve as well as to the motor of the rack drive to control the normal operation of the servobrake and the emergency operation.

The invention also relates to a method for managing a brake system with electric servobrake, this method being characterized in that, in normal operating mode, the control circuit controls the motor of the rack drive of the servobrake and the first solenoid valve to connect the rear volume and the front volume of the simulator chamber to neutralize the interaction of the hydraulic actuator and the intermediate piston, the thrust rod being only driven by the actuator piston. In emergency operating mode, the control circuit controls the first solenoid valve which switches to the closed position separating the fluid connection between the rear volume and the front volume of the simulator chamber and the second solenoid valve to open and connect the front volume with the tank, the thrust rod being only actuated by the displacement of the intermediate piston controlled by the displacement of the hydraulic actuator, the isolated volume being kept constant by the closure of the first solenoid valve.

The method for managing the brake system allows for operation either in normal mode with decoupling of the action of the brake pedal and of the master cylinder or with direct link without decoupling in the case of failure of the servobrake as well as with a direct control of the servobrake independently of any action on the brake pedal, for different automatic operating modes of the vehicle such as speed control, single-line traffic mode with servocontrolled distance relative to the vehicle in front or even emergency braking independently of the driver.

In the case of emergency operation, since the link is cut with the simulator, the effort exerted by the driver is in no way absorbed by the simulator.

BRIEF DESCRIPTION OF THE DRAWINGS

The present invention will be described below in more detail using an embodiment of the invention represented in the appended drawings in which:

FIG. 5 shows, in its parts 5A, 5B, respectively:

in FIG. 5A, the front part of the system consisting of the tandem master cylinder and the front part of the servobrake, in FIG. 5B, the rear part of the servobrake.

DETAILED DESCRIPTION

By convention, to facilitate the description, in the brake system with electric servobrake described below, a distinction will be made between the rear side and the front side for the different components depending on whether they are situated on the side of the brake pedal or on that of the master cylinder or even whether they are facing one or other end of the system. The system has an axis XX relative to which certain parts of the master cylinder and the servobrake are aligned.

The description will be given first on the basis of its principle and in a schematic manner with reference to FIGS. 1 and 2 and then, in more detail, using FIGS. 3 to 5.

Figure 1:
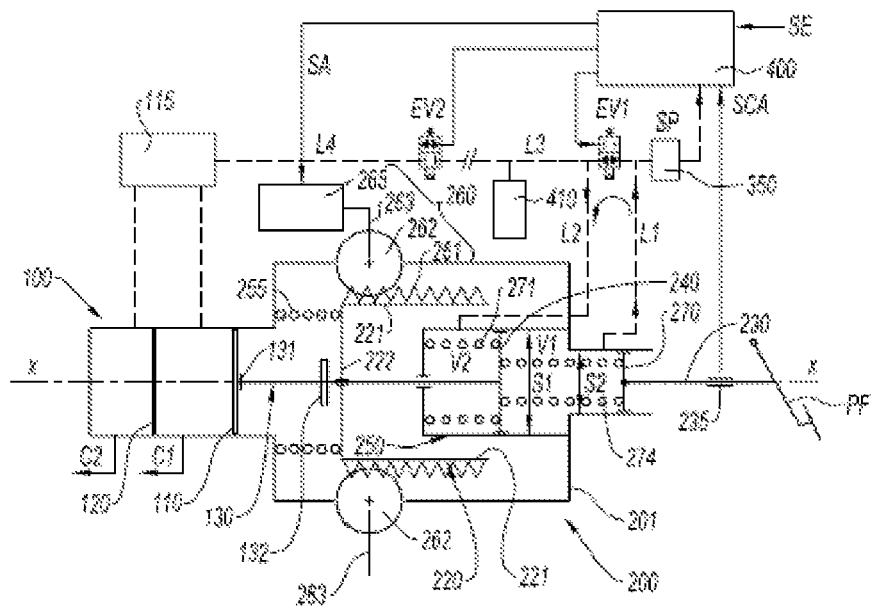
FIG. 1 is a simplified diagram of the brake system with electric servobrake represented for the normal operating mode.
Figure 2:
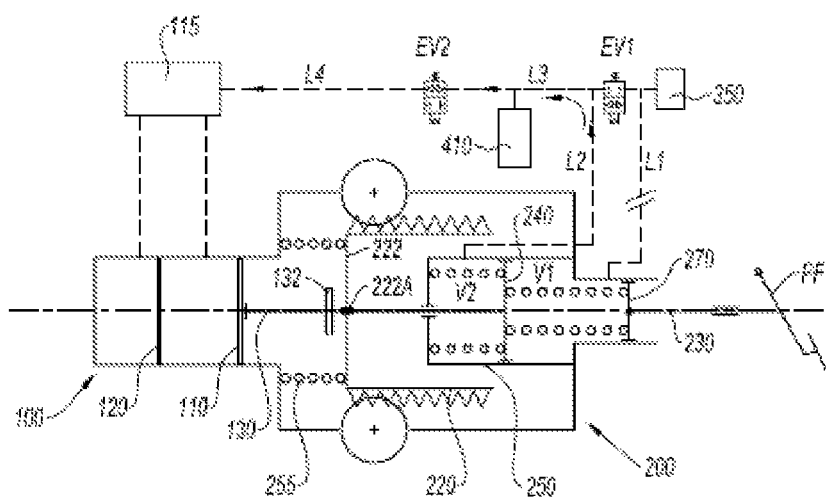
FIG. 2 is a diagram similar to that of FIG. 1, but simplified, corresponding to the emergency operating mode.

According to FIG. 1, the brake system with electric servobrake comprises a master cylinder 100, for example a tandem master cylinder, having a primary piston 110 and a secondary piston 120, supplying hydraulic fluid under pressure to the two brake circuits C1, C2 according to the action exerted on the brake pedal PF. The master cylinder 100 is combined with an electric servobrake 200 having an actuator piston 220, activated by an electric motor 265. The actuator piston 220 is formed by a sleeve 221 provided with a bottom 222 which is passed through by a thrust rod 130.

In this example, the piston 220 is driven by a rack transmission.

The rack drive 260 consists of two racks 261 borne by the outer sides of the sleeve 221 in two positions that are symmetrical relative to the axis XX of the brake system. The racks 261 mesh with two pinions 262 linked to a transmission 263. This transmission 263 consists, for example, of two axes each bearing one of the two pinions 262 and a respective worm wheel (not represented) meshing with a screw borne by the output shaft of the motor 265. In practice, the output shaft of the motor 265 is provided with two screws with opposite threading so that each can drive its worm wheel and the pinion 262 attached to the axis thereof, according to rotational movements in opposite directions. The worm wheel with a large diameter relative to its pinion 262 thus provides a reduction of the movement supplied by the motor 265.

The actuator piston 220 cooperates with the thrust rod 130 to thrust the primary piston 110. The thrust rod 130 opens into the simulator chamber 250 that it divides into two variable volumes V1, V2 via an intermediate piston 240 fixed to the rod 130.

The thrust rod 130, the head 131 of which bears against the primary piston 110, is provided with an abutment 132 against which the actuator piston 220 bears in the direction of the thrust of the primary piston 110; however, conversely, the thrust rod 130 can advance independently of the actuator piston 220 in the case of the emergency operation, also called "backup" operation.

A compression spring 255 pressed against the housing 201 of the servobrake and the bottom of the actuator piston 220 ensures the return of the piston 220.

The return of the thrust rod 130 to bear against the actuator piston 220 is ensured by a return spring 271 between the bottom of the simulator chamber 250 and the intermediate piston 240.

The hydraulic actuator 270 is pushed back against the action of the brake pedal by the operation of the simulator 410 and by a return spring 274 placed between the intermediate piston 240 and the hydraulic actuator 270. A travel sensor 235 detects the displacement of the rod 230 to control the servobrake in the conditions explained later.

In the simulator chamber 250 delimited by a hydraulic actuator 270 linked to the control rod 230:

the rear volume V1 is contained between the hydraulic actuator 270 and the intermediate piston 240, the front volume V2 is contained between the bottom 222 of the simulator chamber 250 and the intermediate piston 240.

The rear volume V1 is linked to the front volume V2 by two ducts L1, L2 equipped with a first solenoid valve EV1; the rear volume V1 is linked to a pressure sensor 350 by its duct L1; the duct L3 downstream of the solenoid valve EV1 is linked to a brake simulator 410 and via a second solenoid valve EV2 and a duct L4, it is linked to the brake fluid tank 115.

The solenoid valves EV1 and EV2 have two positions: an open or passing position and a closed or blocked position. These positions are reversed for the two solenoid valves EV1, EV2 which are simple spring return solenoid valves.

The first solenoid valve EV1 is set to the open position by the application of an electric voltage supplied by the control circuit 400. In the open position, it links the duct L1 to the ducts L2 and L3. In the absence of any control signal, the solenoid valve EV1 switches to the closed inactive position for which it cuts the connection between the duct L1 and the ducts L2 and L3.

The second solenoid valve EV2 is controlled in the closed active position by a control signal. In the closed position, the solenoid valve EV2 cuts the connection between the duct L3 and the duct L4. It is returned to the inactive position in the absence of any control signal by its return spring. In the open position, the solenoid valve EV2 links the duct L3 to the duct L4.

The system is equipped with a control circuit 400 to which the travel sensor 235 and the pressure sensor 350 are linked to control the operation of the solenoid valves EV1 and EV2 and that of the electric motor 265 of the servobrake according to braking programs which are not detailed.

The pressure sensor 350 detects a rise in pressure produced by the hydraulic actuator 270 in the rear volume V1 of the simulator chamber 250 under the effect of an action on the brake pedal PF. The signal SP is transmitted to the control circuit 400 which, also having received the signal SCA from the travel sensor 235, uses this redundancy to monitor the will of the driver. The control circuit 400 starts up (signal SA) the motor 265. The latter drives the thrust rod 130 by its piston 220 applied against the abutment 132 of the rod 130 which thus thrusts the primary piston 110. The driver in return receives the reaction exerted by the simulator 410 on the brake fluid in the volume V1.

This pressure of the simulator 410 is transmitted by the duct L3 and the ducts L2 and L1 to the volumes V1 and V2 which are thus at the same pressure. This balance of the pressures in the volumes V1 and V2 on either side of the intermediate piston 240 does not hamper the driving of the thrust rod 130 by the actuator piston 220 but makes it possible to transmit the reaction of the brake system in the form of a simulated reaction to the hydraulic actuator 270, to the control rod 230 and thus to the brake pedal PF.

The operation of the brake system will be described below by distinguishing the normal operating mode, the emergency operating mode and programmed automatic operating modes. These different operating modes are managed by the control circuit 400 according to the signal SCA supplied by the travel sensor 235 (also called absolute travel sensor), the signal SP supplied by the pressure sensor 350 and external signals SE corresponding to the emergency operating mode (absence of electric power supply to the motor 265) or automatic control operating mode to make the brake system operate independently of the action on the brake pedal PF.

A) Normal Operating Mode (FIG. 1):

At the start of operation, the control circuit 400 on the one hand opens the solenoid valve EV1 so that the volumes V1, V2 are connected and on the other hand closes the solenoid valve EV2 so that the duct L1 linked to the volume V1 is cut from the tank 115.

The volumes V1, V2 are connected and the intermediate piston 240 is hydraulically neutral in the simulator chamber 250; its movement follows only the actuator piston 220 which thrusts the rod 130 by the abutment 132.

The pressure of the fluid in the volume V1 of the simulator chamber 250 is controlled by the simulator 410 which enables the driver to perceive a reaction which varies according to the characteristic of the springs of the simulator (these details are not represented); overall, the reaction of the simulator 410 increases with the thrust exerted on the brake pedal according to a non-linear reaction curve. This reaction of the simulator is a known function which is not detailed.

In parallel, the signal SCA from the travel sensor 235 and the signal SP of the pressure detected by the pressure sensor 350 are transmitted to the control circuit 400 which generates the actuation signal SA for actuating the motor 265 of the servobrake 200 driving the actuator piston 220 thrusting the primary piston 110 of the master cylinder 100. There is no contact between the hydraulic actuator 270 and the thrust rod 130.

B) Emergency Operating Mode (FIG. 2):

In case of an electric failure, the servobrake 200 can no longer assist in the braking. The electric outage produces the return of the two solenoid valves EV1, EV2 to their inactive position by their return spring: the solenoid valve EV1 is closed and the solenoid valve EV2 is opened so that:

the volume V1 is isolated,
the volume V2 is freely connected to the tank 115.

This means that the displacement of the hydraulic actuator 270 under the effect of a thrust exerted on the brake pedal PF, transmitted by the control rod 230, displaces the fluid of the volume V1, which is not variable, which thrusts the intermediate piston 240 which in turn thrusts the primary piston 110 by the thrust rod 130 advancing relative to the actuator piston 220 which remains immobile.

The volume V2 is emptied into the tank 115 via the ducts L2, L3, L4 through the solenoid valve EV2, without opposing any reaction to the advance of the intermediate piston 240.

Given that the section S1 of the hydraulic actuator 270 is less than the section S3 of the intermediate piston 240, there is a gearing-down effect, which makes it possible to exert, on the primary piston 110 via the intermediate piston 240, a force greater than that exerted on the brake pedal, the work being retained.

In the case of a rapid press on the accelerator pedal, the operation of the brake system is, at least at the start, the same as that which has just been described above.

C) Mechanical Emergency Operating Mode:

In case of a total hydraulic loss in the chambers V1 and V2, the movement of the brake pedal PF is transmitted directly by the actuator 270, the compressed spring 274 and the thrust rod 130.

D) Operation by Programmed Control (FIG. 1):

The control circuit 400 can also receive instructions from the system for managing the operation of the vehicle to act directly on the brake system, independently of any action on the brake pedal, for example for operations involving speed regulation, distance regulation relative to a vehicle in front or for emergency braking.

The control circuit 400 then sends a signal SA to the motor 265 to drive the actuator piston 220 and the thrust rod 130 and control the master cylinder 100, independently of any action on the brake pedal. The intermediate piston is neutral since the volumes V1 and V2 are freely connected via the ducts L1 and L2 through the first solenoid valve EV1.

This operation by programmed control assumes that the motor 265 of the rack drive 260 can operate, that is to say that its electrical power supply is assured, which corresponds at least for this point to the situation represented in FIG. 1, the control of the motor 265 being provided by the control circuit 400 sending a control signal SA.

This operation by programmed control, regardless of the external signal SE applied directly to the control circuit 400 independently of any action on the brake pedal PF, assumes that the volumes V1, V2 are connected so that the intermediate piston 240 is neutral which assumes that the solenoid valve EV1, EV2 is in the position represented in FIG. 1 or else that the two volumes V1, V2 are linked to the tank 115 which assumes that the valve EV1 occupies the position of FIG. 1 and the valve EV2, the uncontrolled position, to link the ducts L2 and L4.

For this control programmed independently of the action on the brake pedal PF, there is no need for the simulator 410 to transmit any reaction to the brake pedal.

In some operating conditions, the control circuit 400 can activate the first solenoid valve EV1 and set the second solenoid valve EV2 in the idle position so that the ducts L1, L2, L3, L4 are all linked to the brake fluid tank 115.

The detailed structure of the master cylinder and of the servobrake of the brake system will be described below using FIGS. 3 to 5.

The system is formed by three subassemblies, namely
the master cylinder 100, and
the servobrake 200 consisting of a front part 280 and a rear part 290, joined by tie rods to be fixed to the fire wall of the vehicle separating the engine compartment and the passenger compartment.

The elements of the chambers V1, V2 and of the brake fluid tank 115 and the control circuit 400 are neither represented in FIGS. 3-5B nor described.

Figure 3:
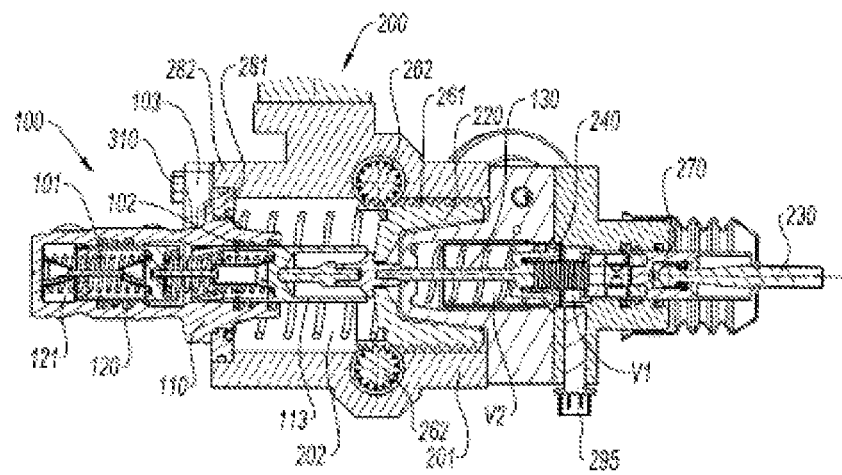
FIG. 3 is an axial cross-sectional view along III-III of FIG. 4 of an embodiment of the brake system according to the invention.

The tandem master cylinder 100 has a known structure, represented in detail in FIG. 3 but whose description will be simplified. Its housing 101 comprises a primary piston 110 and a secondary piston 120 defining a primary chamber 111 and a secondary chamber 121 each linked respectively to a brake circuit. The primary piston 110 comprises an extension 113 open at the rear, and an axial extension 114 to receive the head 131 of the thrust rod 130 actuated by the servobrake 200 or by the control rod 230 in the case of failure of the servobrake. In the idle position of the tandem master cylinder 100, the extension 113 of the primary piston 110 protrudes into the chamber 202 of the servobrake 200.

Figure 4:
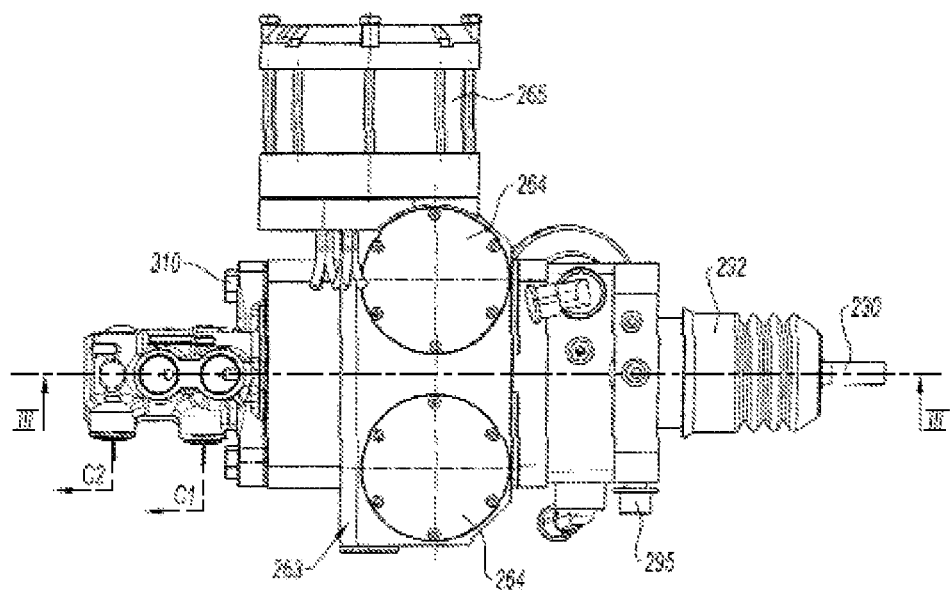
FIG. 4 is a side view of the brake system.

According to the embodiment, the front part 280 of the servobrake receives the rear 102 of the body 101 of the master cylinder 100 and bears the motor 265, the transmission 263 given by way of example and appearing in FIG. 4 as recess for the output shaft of the motor 265 and its two screws each meshing with a large-diameter worm wheel; these worm wheels are each housed in a housing 264 whereas the pinions 262 borne by the worm wheels appear in FIGS. 3, 5A, 5B. The racks 261 and the pinions 262 are in positions that are symmetrical relative to the axis XX to transmit the torque in a distributed and balanced manner to the actuator piston 220.

The thrust rod 130 consists of a front element 130A and of a rear element 130B to facilitate the production and assembly of the servobrake.

The front element 130A bears by its head 131 against the bottom of the primary piston 110; it bears the abutment 132 and is extended toward the rear beyond the abutment 132 by passing through (in this position) a central orifice 222A in the bottom 222 of the actuator piston 220.

The rear element 130B consists of the extension of the rod bearing the intermediate piston 240 (FIGS. 3, 5B).

The rear part 290 in fact consists of two pieces 290A, 290B, one of which (290A) forms the simulator chamber 250 receiving a jacket 251 for the intermediate piston 240 and its return spring 271. This jacket 251 facilitates the production of the piece 290A and its assembly.

The piece 290B receives the hydraulic actuator 270, the control rod 230 and bears the bellows 292 surrounding the rear of the hydraulic actuator 270. The rear piece 290B also includes a connector 295 for the connection of the travel sensor 235.

According to FIGS. 5A, 5B, the front part 130A of the rod 130 is installed in the front part 280 of the body of the servobrake 200 and the rear part 130B of the rod 130, in the rear part 290 of the body of the servobrake 200.

The assembly between the housing 101 of the master cylinder 100 and the front part 280 of the servobrake 200 is achieved via an assembly ring 281 interposed between the extension 102 of the body 101 and the edge 282 of the tubular form of the front part 280. The assembly is achieved by tie rods 310 fixed in the piece 290B of the rear part 290.

The brake system with electric servobrake is applicable to the motor vehicle brake equipment industry.

PARTS LIST

100 Tandem master cylinder
101 Body of the tandem master cylinder
102 Rear of the body
103 Flange
110 Primary piston
113 Extension of the primary piston
115 Brake fluid tank
121 Chamber of the secondary piston
130 Thrust rod
130A Front element of the rod 130
130B Rear element of the rod 130
131 Head of the thrust rod 130
132 Abutment of the thrust rod 130
200 Electric servobrake
201 Servobrake housing
202 Chamber
220 Actuator piston
221 Sleeve
222 Bottom
222A Central orifice
230 Control rod
231 Head of the control rod
235 Travel sensor
240 Intermediate piston
250 Simulator chamber
251 Jacket
255 Return spring
260 Rack drive
261 Rack
262 Pinion
263 Transmission
264 Worm wheel housing
265 Electric motor
270 Hydraulic actuator
271 Return spring
274 Return spring
280 Front part of the body of the servobrake
281 Ring
282 Edge of the front part 280
290 Rear part of the body of the servobrake
290A, 290B Pieces forming the rear part 290
291 Flange
292 Bellows
295 Connector
310 Tie rods
350 Pressure sensor
400 Control circuit
410 Brake simulator
C1, C2 Brake circuits
EV1, EV2 Solenoid valves
V1 Front volume
V2 Rear volume
L1-L4 Ducts
SP Pressure signal
SE External signal
SA Actuation signal
SCA Travel signal
PF Brake pedal

The invention claimed is:

1. A brake system with electric servobrake comprising a servobrake acting in a controlled manner on a master cylinder via a thrust rod driven by the servobrake and actuating a piston (primary piston) of the master cylinder, the servobrake being linked by a hydraulic actuator to the control rod of a brake pedal, characterized in that
    the servobrake (200) comprises
        an actuator piston (220) controlled by an electric motor (265) via a rack drive (260),
        a simulator chamber (250) delimited by the hydraulic actuator (270) and subdivided by an intermediate piston (240) into a rear volume (V1) and a front volume (V2), which are variable, the rear volume (V1) delimited by the hydraulic actuator (270) and the intermediate piston (240), the front volume (V2) delimited in the simulator chamber (250) by the intermediate piston (240), a duct (L1) linking the rear volume (V1) to a duct (L2) linked to the front volume (V2) via a first solenoid valve (EV1), the duct (L2) linked to a tank (115) by a second solenoid valve (EV2), the first solenoid valve (EV1) controlled in an open position, its uncontrolled position being a closed position, the second solenoid valve (EV2) controlled in a closed position, its uncontrolled position being an open position, the intermediate piston (240) is linked to the thrust rod (130) bearing an abutment (132) thrust by the actuator piston (220), the thrust rod (130) being thrust by the intermediate piston (240) independently of the actuator piston (220).

2. The brake system according to claim 1, characterized in that a duct (L3) at an output of the first solenoid valve (EV1) is linked to a brake simulator (410).

3. The brake system according to claim 1, characterized in that the actuator piston (220) consists of a sleeve (221), a outer surface of which includes racks (261) in positions diametrically opposite relative to the axis (XX) of the system for guiding and driving in translation the actuator piston (220) partly overlapping the simulator chamber (250).

4. The brake system according to claim 1, characterized in that the intermediate piston (240) has a section (S1) greater than the section (S2) of the hydraulic actuator (270).

5. The brake system according to claim 1, characterized in that a body (201) of the servobrake (200) includes a substantially cylindrical front part (280) and a rear part (290), the substantially cylindrical front part (280) receiving a rear (102) of the housing (101) of the master cylinder (100) via an assembly ring (281) and two pinions (262) of the rack drive (260) and the actuator piston (220) bearing racks (261), the front part (280) also being provided with a transmission (263) and the motor (265) of the rack drive (260) and a front part (130A) of the thrust rod (130) with an abutment (132) and a return spring (255), the rear part (290) including the intermediate piston (240) attached to a rear part (130B) of the thrust rod, a return spring (271) of the intermediate piston (240) and the hydraulic actuator (270) and its return spring (274).

6. The brake system according to claim 5, characterized in that the rear part (290) includes two pieces (290A, 290B) of which a front piece (290A) forms the simulator chamber (250) with a jacket (251) receiving the intermediate piston (240) and a rear piece (290B) houses the hydraulic actuator (270), the return spring (274) of the hydraulic actuator (270) being placed between the hydraulic actuator (270) and the intermediate piston (240).

7. The brake system according to claim 1, characterized in that the brake system includes a control circuit (400) and a pressure sensor (350) linked to the rear volume (V1) of the simulator chamber (250), contained between the hydraulic actuator (270) and the intermediate piston (240) to detect a pressure prevailing in this volume (V1) and transmit a pressure signal (SP) to the control circuit (400), the control circuit (400) being linked to the first solenoid valve (EV1) and to the second solenoid valve (EV2) as well as to the motor (265) of the rack drive (260) to control a normal operation of the servobrake and an emergency operation of the servobrake.

8. A method for managing a brake system with an electric servobrake according to claim 1, characterized in that in a normal operating mode, a control circuit (400) controls the motor (265) of the rack drive (260) of the servobrake and the first solenoid valve (EV1) to connect the rear volume (V1) and the front volume (V2) of the simulator chamber (250) to neutralize an interaction of the hydraulic actuator (270) and the intermediate piston (240), the thrust rod (130) only driven by the actuator piston (220), in an emergency operating mode, the control circuit (400) controls the first solenoid valve (EV1) which switches to the closed position separating the fluid connection between the rear volume (V1) and the front volume (V2) of the simulator chamber (250) and the second solenoid valve (EV2) to open and connect the front volume (V2) with the tank (115), the thrust rod (130) only actuated by a displacement of the intermediate piston (240) controlled by a displacement of the hydraulic actuator (270), the isolated volume (V1) kept constant by the closure of the first solenoid valve (EV1).

* * * * *